Figure 6:
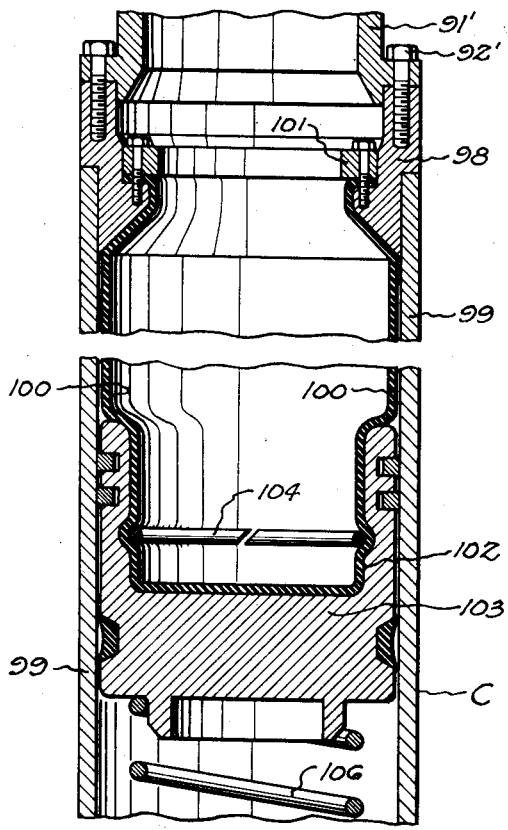

Nov. 10, 1942.    A. F. SPENGLER    2,301,340
MOTOR OR THE LIKE
Filed Dec. 27, 1938    3 Sheets-Sheet 1
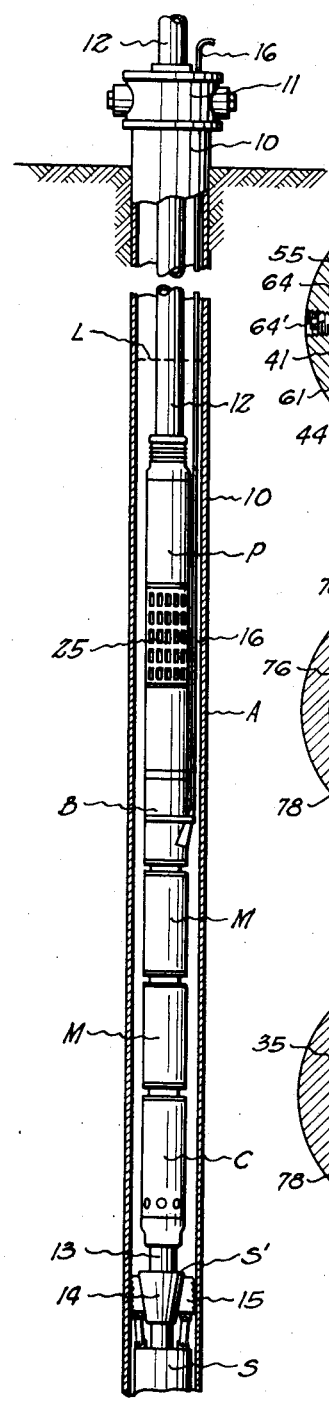
Fig. 1.
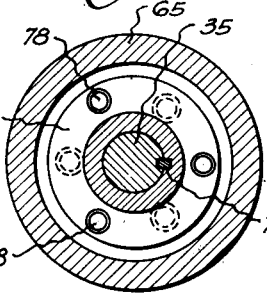
Fig. 10.
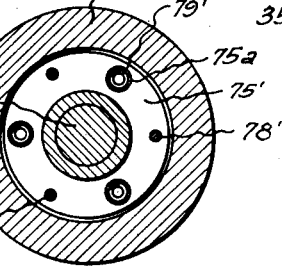
Fig. 11.
Fig. 12.
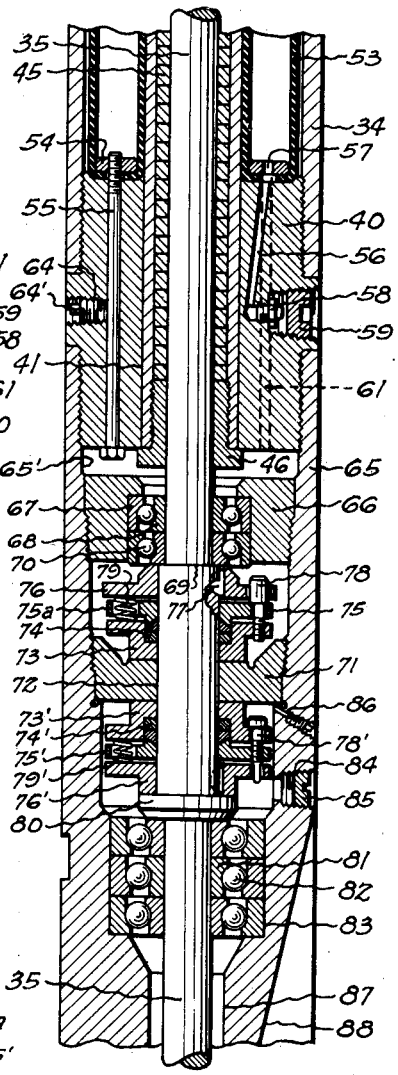
Fig. 5.
Inventor
Arthur F. Spengler
Attorney

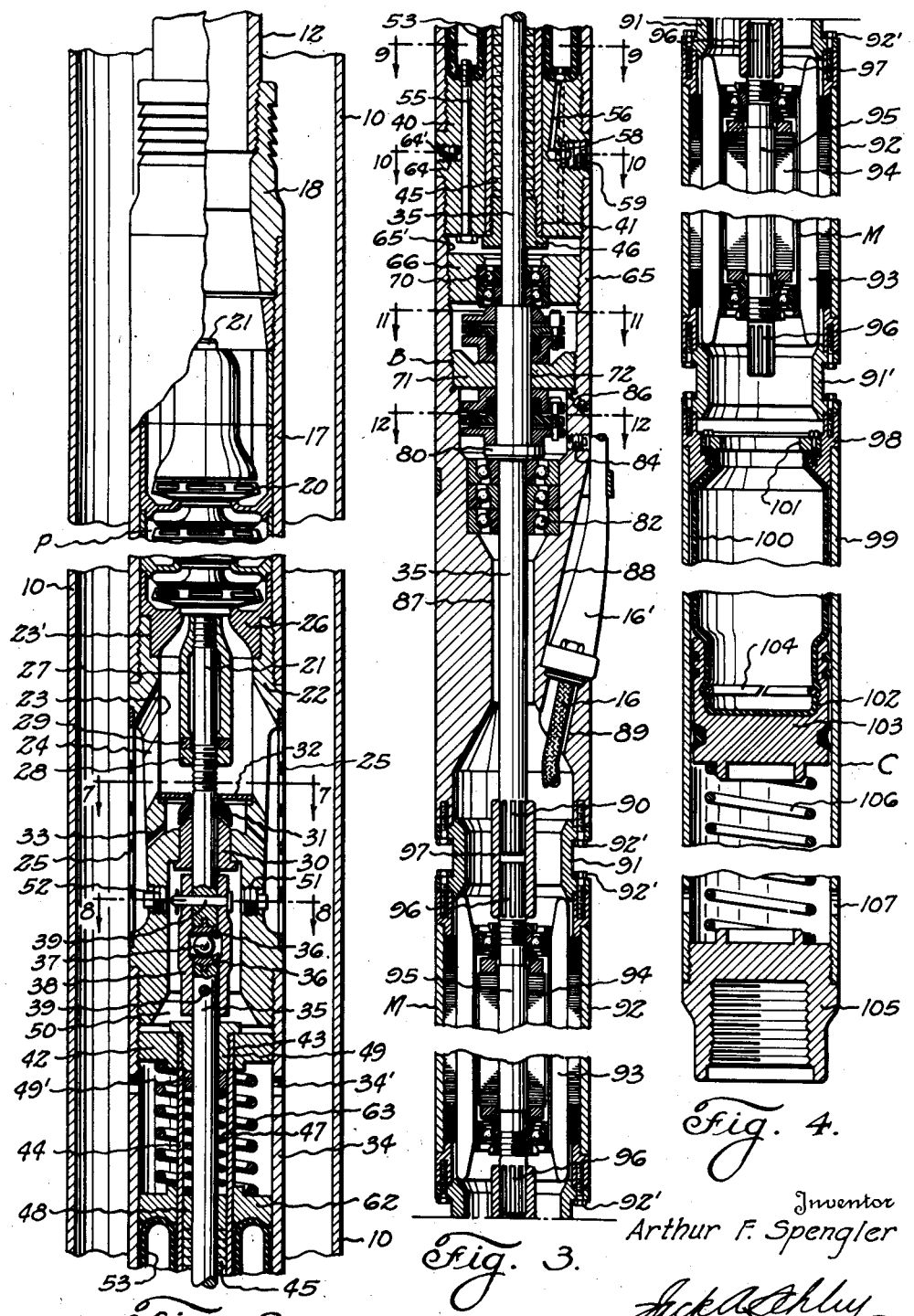

Nov. 10, 1942.　　　A. F. SPENGLER　　　2,301,340
MOTOR OR THE LIKE
Filed Dec. 27, 1938　　　3 Sheets-Sheet 3

Inventor
Arthur F. Spengler

By Jack A. Ashley
Attorney

Patented Nov. 10, 1942

2,301,340

UNITED STATES PATENT OFFICE 2,301,340

MOTOR OR THE LIKE

Arthur F. Spengler, Los Angeles, Calif.

Application December 27, 1938, Serial No. 247,744

9 Claims. (Cl. 172—36)

This invention relates to new and useful improvements in motor or the like.

One object of the invention is to provide an improved pumping apparatus which is electrically operated and which is particularly adapted for use in wells for pumping the well fluids to the surface.

An important object of the invention is to provide an improved pumping apparatus, wherein an electrically operated motor is utilized to drive a centrifugal pump, said apparatus having improved means for lubricating the motor, said means being arranged to substantially equalize the pressure of the lubricant in the motor with the well pressure and also acting to compensate for expansion and contraction of the lubricant due to temperature variations, whereby efficient lubrication of the motor, under all conditions, is had.

A particular object of the invention is to provide an improved pumping apparatus which is so constructed that one or more electric motor units may be employed to drive the same; the arrangement being such that the units may be readily removed from or coupled in position, whereby any desired amount of power may be obtained, and also whereby in the event one motor unit is short circuited or otherwise rendered inoperative, the other motor units are not affected and it is only necessary to replace the disabled unit.

Another object of the invention is to provide an apparatus of the character described, wherein an improved packing means for sealing off the electrically operated motor unit to positively prevent any water, which may settle out of the fluids being pumped, from passing to said motor unit, whereby danger of the unit being short circuited, or its operation otherwise impaired, is obviated.

A further object of the invention is to provide a pumping apparatus including a centrifugal pump which is connected, by a drive shaft, with an electric motor and having improved bearing supports for said drive shaft, together with improved means for lubricating said bearings, thereby assuring efficient operation and longer wear.

Still another object of the invention is to provide an apparatus of the character described, wherein an improved packing arrangement is employed, whereby the centrifugal pump is sealed off from the supporting bearings for the drive shaft, and said bearings are, in turn, sealed off from the electric motor unit, whereby the fluids or lubricants present in each unit of the apparatus cannot escape into the other units thereof.

A still further object of the invention is to provide an improved pumping apparatus which is electrically operated and which may be readily lowered into a well and set at a desired elevation therein; the construction being simple and compact, whereby costs are reduced and manufacture simplified.

A construction designed to carry out the invention will be hereinafter described, together with other features of the invention.

Figure 7:
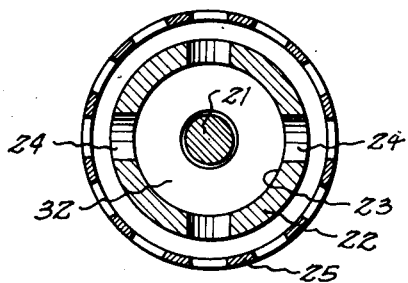
Figure 8:
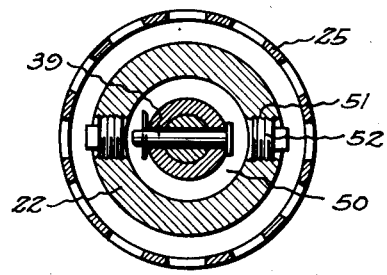
Figure 9:
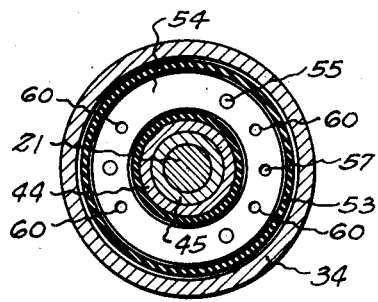

The invention will be more readily understood from a reading of the following specification and by reference to the accompanying drawings, in which an example of the invention is shown, and wherein:

Figure 1 is an elevation of a pumping apparatus, constructed in accordance with the invention and illustrating the same mounted within a well casing, the latter being shown in section, Figure 2 is a view partly in elevation and partly in section of the upper portion of the apparatus, Figure 3 is a transverse, vertical, sectional view of the intermediate portion of the apparatus, said view being a continuation of Figure 2, Figure 4 is a continuation of Figure 3 and showing the lower portion of the device, Figure 5 is an enlarged, transverse, vertical, sectional view of the bearing assembly which supports the drive shaft, Figure 6 is an enlarged, transverse, vertical, sectional view of the piston and flexible casing which is mounted below the motor unit for compensating for expansion and contraction of the lubricant for the motor, Figure 7 is a horizontal, cross-sectional view taken on the line 7—7 of Figure 2, Figure 8 is a horizontal, cross-sectional view taken on the line 8—8 of Figure 2, Figure 9 is a horizontal, cross-sectional view taken on the line 9—9 of Figure 3, Figure 10 is a horizontal, cross-sectional view taken on the line 10—10 of Figure 3, Figure 11 is a horizontal, cross-sectional view taken on the line 11—11 of Figure 3, and Figure 12 is a horizontal, cross-sectional view taken on the line 12—12 of Figure 3.

In the drawings, the letter A designates a well bore having the well casing 10 mounted therein in the usual manner. The upper end of the casing carries a casing head 11, while the lower end (not shown) of said casing communicates with the producing formation of the bore, whereby the well fluids may flow into and upwardly through said casing. The improved pumping apparatus is arranged to be connected to, and supported by, the well tubing 12 and lowered therewith into the well casing. The tubing extends axially through said casing and through the casing head, as is the usual practice.

The pumping apparatus includes a centrifugal pump unit P which has its lower end connected to an electric motor unit M by means of a packing and bearing assembly B. Any desired number of motor units M may be coupled together, as will be hereinafter explained, and a compensator C is attached to the lowermost unit M. A tubing catcher S including a slip assembly S' is connected with the compensator and includes a mandrel 13 which is threaded into the lower end of said compensator. The mandrel is provided with a slip head 14 having radially movable gripping slips 15 slidable thereon, which slips are arranged to function in the usual manner to engage the wall of the well casing 10 in the event the tubing should break or a sudden drop of said tubing should occur. The particular construction of the tubing catcher forms no part of the present invention and is subject to variation.

The apparatus is connected to the well tubing 12 at the surface of the well and is lowered therewith into the well casing. As is well known, each well ordinarily has a standing liquid level which varies in accordance with the particular conditions of said well and it is preferable that the apparatus be lowered below such standing liquid level. As shown in Figure 1, the level is indicated by the dotted line L but, as above noted, this level could be below the upper end of the apparatus. The apparatus is lowered into the casing to the desired position, being supported by the tubing, and a cable or electrical conductor 16 extends through the casing head 11 and passes downwardly along the exterior of said tubing and apparatus. The lower end of the cable extends through the housing of the bearing assembly B and is electrically connected with the motor units M, whereby electrical current is conducted to said units. When the motor units are operated, the centrifugal pump unit P is actuated to pump the well fluid from the casing, and upwardly through the well tubing 12, whereby the well fluids are lifted to the surface.

The centrifugal pump unit P includes an elongate shell or housing 17 (Figure 2) having a coupling collar 18 threaded into its upper end and this collar is arranged to receive the lower end of the well tubing 12. The impeller elements 20 of the pump unit are mounted within the housing on a suitable impeller shaft 21 which is rotatable within the housing. It is noted that the particular construction of the centrifugal pump unit forms no part of the present invention and, therefore, is subject to variation. The impellers, and mounting thereof, may be in any suitable manner.

The lower end of the housing 17 is threaded onto the upper end of an elongate inlet sleeve 22 which has its bore 23 communicating with the bore of said housing, wherein the impellers are mounted. The central portion of the exterior surface of the sleeve is recessed and is formed with a plurality of radial slots 24 which extend vertically of the sleeve. Manifestly, the slots establish communication between the interior of the well casing 10 and the bore of the housing 17, whereby the well fluids from the casing may enter the housing to be picked up by the impeller elements 20 and lifted to the surface through the well tubing. The recessed exterior of the sleeve is surrounded by an annular perforated section or screen 25 which prevents large extraneous objects which may be present in the well fluids from passing to the impellers 20 of the pump unit.

The lowermost impeller element 20 is rotatable upon a flanged bearing collar or diffuser base 26 which has its lower end secured within a countersunk portion 23' provided at the upper end of the bore 23 of the sleeve. The bore of the collar is reduced toward its upper end to direct the well fluids flowing from the well casing upwardly through the sleeve 22, into the pump housing. The impeller shaft 21 extends axially and downwardly through the bore of the base 26 and through the sleeve 22 and, for supporting the impellers on the shaft, an elongate retaining sleeve 27 has its upper end threaded onto said shaft. The upper end of the retaining sleeve abuts the underside of the lowermost impeller and a lock nut 28 is threaded onto the shaft below said sleeve, a washer 29 being interposed between said nut and said sleeve.

Below the vertical inlet openings or slots 24, the bore of the sleeve 22 is reduced and a bearing collar 30 is fixed within this reduced portion. The lower portion of the impeller shaft has a turning fit within this bearing collar, whereby said lower portion is supported in proper alinement. To prevent water which may settle out of the well fluids being pumped, from falling downwardly through the bore of the sleeve and then flowing downwardly through the space between the shaft 21 and bearing collar 30, an inverted packing cup 31 surrounds the shaft immediately above the collar. A transverse partition 32 is disposed across the bore of the sleeve above the cup and prevents any extraneous matter from accumulating on the cup and on the bearing collar 30. Any water or fluid which accumulates above the collar around the packing cup may drain from the bore of the sleeve 22 through inclined drain ports 33, which extend through the wall of the sleeve and which are provided for the purpose.

The sleeve 22 extends downwardly below the bearing collar 30 and has its lower end threaded to an elongate housing 34 which forms the upper portion of the housing of the packing and bearing assembly B. The lower end of the impeller shaft 21 terminates below the collar 30 and is spaced from the upper end of a drive shaft 35 which extends upwardly into the lower end of the bore of the sleeve 22. The adjacent ends of the shafts 21 and 35 are provided with curved bearing faces 36 and a ball 37 is interposed between and engages said faces. A coupling collar 38 surrounds the adjacent ends of the shafts and is secured to said shafts by transverse pins 39. With this arrangement, the shafts 21 and 35 are coupled together and the ball 37 not only compensates for any slight misalinement of said shafts, but also provides a longitudinal thrust bearing for said shafts.

The lower end of the housing 34 has threaded connection with the upper end of a connecting nipple 40 (Figure 3) and this nipple has an axial bore 41 extending vertically therethrough. A transverse partition or disk 42 is threaded into the upper end of the housing 34 and is provided with an axial opening 43 into which the upper end of an elongate tubular section or pipe 44 is secured. The lower end of the section or pipe extends through the bore 41 of the nipple 40 and is suitably fastened therein. The diameter of the bore of the section 44 is larger than the exterior diameter of the drive shaft 35 and said shaft extends completely through said section, its lower end terminating at a point well below the nipple 40, as will be explained. The difference in diameter between the exterior of the drive shaft and the bore of the tubular section provides an annular space around the shaft and for packing off this annular space, a plurality of packing rings 45 surround the shaft and are confined within the section. The rings are supported on a packing gland 46 which is screwed into the lower end of the bore of the section and a constant pressure is exerted on the rings by a coiled spring 47 which surrounds the shaft and which is located within the upper end of the section. The lower end of the spring engages a follower ring 48 which rests on the uppermost packing ring, while the upper end of said spring is confined beneath an adjustable gland 49 which is threaded into the upper end of the tubular section 44. If desired, a bearing ring 49' may be interposed between the spring and gland. Obviously, with this arrangement, the space around the drive shaft 35, which is rotatable, as will be hereinafter explained, is packed off and it is impossible for fluid to by-pass along the surface of said drive shaft.

It is pointed out that the partition 42 in the upper end of the housing 34 forms a chamber 50 between said partition and the bearing collar 30 within which the lower end of the impeller shaft 21 rotates. The coupling connecting the shafts 21 and 35 is located within this chamber and a suitable lubricant may be introduced into said chamber to lubricate said coupling through radial inlet ports 51. These ports are normally closed by plugs 52 and, manifestly, the lubricant cannot pass downwardly from said chamber because of the partition 42 and also because of the packing around the drive shaft. The provision of the inverted packing cup 31 prevents the lubricant from flowing upwardly around the shaft 21.

The interior of the housing 34 between the partition 42 and the nipple 40 provides a chamber wherein an annular lubricant retainer or bag 53 is mounted. This bag is constructed of an elastic material, which is preferably oil resistant, such as Neoprene, or similar material, and has its lower end clamped to the top of the nipple by a fastening ring 54 which overlies the inturned edge portions of the bag. Elongate fastening bolts 55 extend through the nipple and have their upper ends threaded into the ring 54. A suitable lubricant, preferably a grease which is heavier than water, is introduced into the annular bag 53 through an angular inlet passage 56, which is formed in the nipple. The upper end of the passage registers with an opening 57 in the ring 54. The outer end of the passage has an ordinary fitting 58 of the usual construction mounted therein, whereby the usual lubricating tools may be employed. Beyond the fitting the passage is enlarged and threaded to receive a plug 59.

The lubricant escapes from the flexible bag or container through openings 60 formed in the ring 54 (Figure 9) and then through vertical passages 61 which extend through the nipple 40 and which have their upper ends in registration with the openings 60. The lubricant passes into the space below the nipple, as will be presently explained. For exerting a constant pressure on the flexible lubricant bag 53, a follower ring 62 rests on the upper end of said bag, which is preferably rounded, and a coiled spring 63, which surrounds the tubular section 44, is confined between the follower ring and the underside of the transverse partition 42 at the upper end of the housing 34. This spring exerts its pressure to constantly urge the bag downwardly, whereby the lubricant therein is forced outwardly and downwardly through the passages 61 to the space below the nipple 40. The upper end of the bag is also exposed to the pressure of the well fluid in the casing through ports 34' in the housing 34 and this pressure is added to the spring pressure to urge the bag downwardly. The bag may be drained at any desired time through a radial port 64 which is normally closed by a plug 64'. As shown in Figure 5, the port communicates with one of the bolt holes for the bolts 55.

An elongate housing 65 which has substantially the same external diameter as the nipple 40 and housing 34, has its upper end threaded onto the lower end of the nipple 40 and this housing contains the bearing supports for the drive shaft 35, which shaft extends axially through said housing (Figure 5). A supporting block 66 is threaded into the upper end of the bore 65' of the housing 65 and this block has an axial opening within which annular outer bearing races 67 are mounted. Inner bearing races 68 surround the shaft 35, being supported on an external annular shoulder 69 on the shaft which is formed by slightly enlarging said shaft. Ball bearings 70 are confined between the races in the usual manner.

Since the block 66 is spaced from the lower end of the nipple 40, it will be obvious that the lubricant which is forced from the flexible retainer 53 through the passages 61, will flow downwardly onto the ball bearings 70 and races 67. For packing off around the drive shaft 35 to prevent this lubricant from flowing downwardly along the surface of the shaft, a bearing ring 71 is mounted, by screw-threads, or otherwise, in the bore of the housing 65 below the block 66. This ring has a bore 72 through which the drive shaft 35 extends and said shaft preferably has a turning fit in said bore. An annular, flanged collar 73 surrounds the shaft 35 and is rotatably supported on the upper surface of the ring 71. It is preferable that the abutting surfaces of the collar and ring be ground. Packing rings 74 surround the shaft and are confined within the collar 73, being retained therein by a flanged packing gland 75 which has its lower end abutting the packing rings. A flanged ring 76 surrounds the gland above the gland and this ring is keyed to the shaft by a key 77, whereby it is rotatable therewith. This ring is rotatably connected with the packing gland 75 and with the collar 73 by pins 78 which pass through openings in the flanges of the ring and gland and are threaded into openings in the flange of the collar. The upper ends of the pins 78 have enlarged heads which engage the upper surface of the gland 75 and by tightening said screws the gland is urged downwardly to tighten the packing rings within the collar 73. With this arrangement, the packing assembly consisting of the ring, gland and collar is rotatable with the drive shaft. The upper side of the ring is upset and bears against the inner bearing race 68 and for holding the ring in contact with the race, as well as for holding the collar 73 in contact with the ring 71, a plurality of coiled springs 79 are interposed between the ring and collar, said springs extending through openings 75a in the flange of the gland 75. It will be evident that since the packing assembly rotates with the shaft, the packing rings 74 pack off therearound and the lubricant which is conducted to the ball bearings 70 and races 67 and 68 cannot escape downwardly past the shaft 35.

Below the bearing ring 71, the shaft 35 is formed with an external annular flange 80 and this flange rests upon a series of ball bearing races 81 which are associated with ball bearings 82. As is clearly shown in Figure 5, the ball bearing assembly is mounted within a reduced portion 83 of the bore of the housing 65 and said assembly is spaced from the bearing ring 71, whereby a chamber is formed therebetween. Lubricant, which is preferably a light transformer oil, for lubricating this bearing assembly is introduced through an inlet port 84, which is provided in the wall of the housing and which is normally closed by a plug 85. A bleeder port 86, normally plugged for permitting escape of air from the chamber during filling thereof, is also provided in the wall of the housing above the inlet port.

For packing off around the shaft 35 to prevent the lubricant from the chamber below the bearing ring 71 from escaping upwardly past the shaft, a packing assembly is located between said bearing ring and the external flange 80 on the shaft. This packing assembly is similar to the one located above the bearing ring 71 and includes a collar 73', packing rings 74', gland 75', and flanged ring 76'. The ring 76' is keyed to the shaft and is rotatably connected to the gland 75' and collar 73' by pins 78' which have their extremities engaging in openings in the flanges of the ring and collar, with their intermediate portions threaded in openings in the flange of the gland. Coiled springs 79' are interposed between the collar 73' and the flanged ring 76' and act to hold the collar in contact with the bearing ring 71, and the ring 76' in engagement with the external flange 80 on the drive shaft 35. Obviously, the packing assembly serves to prevent the lubricant which lubricates the bearings 82 from flowing upwardly along the drive shaft. Also, this assembly prevents any water which may have seeped into the chamber above the bearing ring 71 from flowing downwardly into the bearings 82 and the motor units M therebelow.

Below the bearings 82, the bore of the housing 65 is reduced, as shown at 87, after which said bore is again enlarged. Opposite the point at which the bore is reduced, the exterior of the housing is formed with a recess 88. The vertical wall of this recess is inclined inwardly and the lower end of said recess communicates through an opening 89 with the lower end of the bore of the housing. The cable or electrical conductor 16 which extends downwardly from the surface and which conducts electrical current to the motor unit M, extends through a sheath or conduit 16' which has its lower end secured within the recess 88. The lower portion of the cable 16 enters the bore of the housing and connects with the motor units M to supply electrical current thereto. The extreme lower end of the drive shaft 35 terminates adjacent the lower end of the housing 65 and is provided with longitudinal keys or splines 90.

The lower end of the housing 65 is connected by means of a flanged coupling collar 91 with a motor unit 92, said collar being bolted to the housing and to the unit by bolts 92'. The motor unit includes the usual field 93 and armature 94, which armature is mounted on the motor shaft 95. The upper end of the motor shaft terminates short of the drive shaft 35 and is provided with longitudinal keys or splines 96. A coupling sleeve 97 having longitudinal grooves in its bore, connects the ends of the shafts 35 and 95, whereby a driving connection is had between these shafts. Manifestly, when the motor unit 92 is energized, the shaft 95 is rotated which rotates the drive shaft 35. Since the upper end of the drive shaft 35 is connected to the lower end of the impeller shaft 21, as has been explained, it will be manifest that the impellers 20 of the pump unit P are operated. Such operation of the impellers will pump the fluid from the casing 10 upwardly through the well tubing 12 in the usual manner.

The lower end of the motor unit 92 is connected by means of another coupling collar 91 with another motor unit 92. This unit is identical in construction with the upper unit 92 and has its shaft 95 terminating short or spaced from the lower end of the shaft 95 of the upper motor unit. The same driving connection, including the splines and sleeve, is made between the motor shafts and thus the two motor units operate simultaneously. The lower end of the motor shaft of the bottom unit is also splined and, obviously, any desired number of these units may be connected together in order to drive the shaft 35. Only two of these motor units have been shown but it is pointed out that any desired number may be employed. The motor units may be readily connected together or disconnected from each other by merely removing the bolts 92' which hold the coupling collars 91 in connecting position.

The lowermost motor unit 92 has a coupling collar 91' bolted thereto and this collar is similar in construction to the collar 91. A flanged ring 98 is secured to the collar 91' and the lower portion of this ring is secured within the upper end of an elongate shell or jacket 99. A cylindrical casing 100, which is constructed of a flexible material, has its upper end secured to the ring 98 by means of a retaining ring 101 bolted to a shoulder formed within the ring. The casing 100 is preferably constructed of an elastic, oil resisting material and the lower end of this casing is closed. This lower end of the casing is inserted within the bore 102 of a piston 103 which is slidable within the shell 99 and said shell forms a cylinder, in which the piston may reciprocate. The casing 100 is secured within the bore of the piston by means of a slit ring 104 which is preferably constructed of spring steel or other resilient material. A plug 105 closes the lower end of the cylinder or shell 99 and a coiled spring 106 is confined between this plug and the underside of the piston. Ports 107 are formed in the lower end of the shell above the plug, whereby the well fluid may enter the lower end of the shell 99 and act against the piston. It will be manifest that the coiled spring 106 constantly exerts its pressure to urge the piston 103 upwardly, thereby tending to collapse the flexible casing 100.

It will be manifest by observing Figures 3 and 4 that the interior of the flexible casing 100 communicates through the motor unit 92 with the lower end of the bore of the housing 65 and, therefore, the lubricant which is introduced to lubricate the bearings 82 and which is preferably a light transformer oil, may flow downwardly through the motor unit and into the casing 100. It is well known that the electric motor unit must operate in a lubricant and thus the entire assembly below the ring 71 is filled with such lubricant. As the motors operate, they become heated and thereby heat the lubricant and the flexible casing 100 compensates for the contraction and expansion of this lubricant. As the motors become heated and the lubricant expands, the flexible casing 100 expands thereby forcing the piston 103 downwardly. As the motors cool, the coiled spring 106 below the piston forces the casing 100 upwardly thereby compensating for the contraction of the fluid. It is pointed out that the spring 106 may be eliminated, in which case the pressure of the well fluid would serve to urge the piston upwardly at all times.

The provision of the flexible casing 100 and piston 103 also serves to substantially equalize the pressure of the lubricant within the motor units with the well pressure. Manifestly, the well pressure varies and if such pressure is greater than the pressure within the motor units, then the piston will be moved upwardly within its cylinder until the pressure of the lubricant within the motor units is built up to substantially the same pressure as that of the well fluids. Of course, when the spring 106 is employed, the strength of this spring is added to the well pressure acting against the piston to maintain the lubricant pressure within the units slightly greater than said well pressure. With this arrangement, there is no possibility of the motor units being collapsed by excessive well pressure. Also, if a slight leak should occur and some of the lubricant should escape, then the piston automatically increases the pressure on the remaining lubricant to prevent the well fluids entering said motor units.

The operation of the device is obvious. When the motor units are energized, the drive shaft 35 is rotated to rotate the impeller shaft 21 and thereby rotate the impellers 20. Rotation of the impellers pumps the fluid from the well casing 10 upwardly through the well tubing 12, as has been explained. The connection between the shaft 21 and the drive shaft 35 operates in oil and this oil cannot escape downwardly because of the packing 45 which surrounds the drive shaft. Also, the well fluids cannot enter the chamber wherein the coupling between the shaft 21 and 35 is operating because of the inverted packing cup 31.

The lower end of the drive shaft 35 is supported by suitable bearings 70 and 82. The bearings 70 are constantly lubricated by means of the annular lubricant retainer or bag 53 which, as has been explained, constantly feeds a lubricant to these upper bearings. The lubricant from these bearings cannot escape downwardly past the shaft 35 because of the packing assembly which includes the packing rings 74. The lower bearings 82 which support the shaft 35 are supplied with a lubricant through the ports 84 and this lubricant may flow downwardly into the motor unit and into the casing 100, as has been explained. However, this lubricant cannot escape upwardly around the drive shaft 35 because of the packing assembly which includes the packing rings 74'. Thus, an electrically operated well pump, which has means for operating the wearing parts in a suitable lubricant, is provided. Because of the improved packing arrangement, there is no possibility of the well fluid ever entering the packing chambers or the lubricating chambers. It is impossible for any water which may settle out of the well fluids to flow downwardly into the motors M and thereby short circuit the same or otherwise impair their operation.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An apparatus for actuating a well pump unit including, a housing secured to said unit, a drive shaft rotatable within the housing and adapted to be connected with the pump, an electric motor secured to the lower end of the housing and having a shaft arranged to be connected with the drive shaft for imparting rotation thereto to operate the pump, a cylinder depending from the motor unit, a flexible casing within the upper portion of the cylinder and having a closed bottom whereby the lubricant within the motor is retained and cannot escape therefrom, and a piston secured to the casing and movable in the cylinder, said piston and flexible casing permitting expansion and contraction of the lubricant due to temperature changes.

2. An apparatus for actuating a well pump unit including, a housing secured to said unit, a drive shaft rotatable within the housing and adapted to be connected with the pump, an electric motor secured to the lower end of the housing and having a shaft arranged to be connected with the drive shaft for imparting rotation thereto to operate the pump, a casing connected to the lower end of the motor and communicating therewith for receiving a lubricant for lubricating the motor, and expansible means within the casing and providing a closure for the bore thereof, said last named means being actuated by the differential in pressure between the lubricant in the motor and the well fluids outside said motor for substantially equalizing these pressures.

3. An apparatus for actuating a well pump unit including, a housing secured to said unit, a drive shaft rotatable within the housing and adapted to be connected with the pump, an electric motor secured to the lower end of the housing and having a shaft arranged to be connected with the drive shaft for imparting rotation thereto to operate the pump, a casing connected to the lower end of the motor and communicating therewith for receiving a lubricant for lubricating the motor, and expansible means within the casing and providing a closure for the core thereof, said last named means being actuated by the differential in pressure between the lubricant in the motor and the well fluids outside said motor for substantially equalizing these pressures, said last named means also serving to compensate for expansion and contraction of the lubricant within the motor due to temperature changes.

4. An apparatus for actuating a well pump including, a housing, upper bearings mounted in the housing, lower bearings also mounted within the housing and spaced from the upper bearings, a drive shaft journaled to rotate in said bearings and adapted to drive the pump, means for lubricating the upper bearings by a force feed, means for introducing a lubricant to the lower bearings, sealing means surrounding the drive shaft between the upper bearings and the lower bearings to prevent the passage of lubricant from one to the other, and electrically operated means connected with the lower end of the drive shaft for rotating the same.

5. An apparatus for actuating a pump including, a housing, upper bearings mounted in the housing, lower bearings also mounted within the housing and spaced from the upper bearings, a drive shaft journaled to rotate in said bearings and adapted to be connected with the pump, packing means surrounding the drive shaft above the upper bearings for preventing a flow downwardly along the shaft to said upper bearings, means for lubricating the upper bearings by a force feed, means for introducing a lubricant to the lower bearings, sealing means surrounding the drive shaft between the upper bearings and the lower bearings to prevent the passage of lubricant from one to the other, and electrically operated means connected with the lower end of the drive shaft for rotating the same.

6. A drive unit for submergible pumps including, a housing, a rotatable drive shaft extending axially within the housing, an upper bearing assembly within the housing surrounding the shaft, a lower bearing assembly also surrounding the shaft and spaced from the upper bearing assembly, a lubricant chamber above the upper bearing assembly and communicating therewith, spring-pressed means within the chamber for forcing the lubricant from said chamber to said upper bearing assembly, and packing surrounding the shaft above and below the upper bearing assembly to prevent the lubricant from flowing along said shaft.

7. A drive unit for submergible pumps including, a housing, a rotatable drive shaft extending axially within the housing and adapted to be connected with the pump, a lower bearing assembly surrounding the shaft near the lower portion thereof, an upper bearing assembly spaced from the lower bearing assembly, packing means surrounding the shaft between the bearing assemblies to pack off around said shaft, the housing having an annular lubricant chamber above the upper bearing assembly and communicating therewith, a flexible lubricant retainer mounted in the chamber and arranged to receive a lubricant, and means for applying pressure to the exterior of the retainer to force the lubricant therefrom and into the upper bearing assembly to lubricate the same.

8. A drive unit for submergible pumps including, a housing, a rotatable drive shaft extending axially within the housing and adapted to be connected with the pump, a lower bearing assembly surrounding the shaft near the lower portion thereof, an upper bearing assembly spaced from the lower bearing assembly, packing means surrounding the shaft between the bearing assemblies to pack off around said shaft, the housing having an annular lubricant chamber above the upper bearing assembly and communicating therewith, a flexible lubricant retainer mounted in the chamber and arranged to receive a lubricant, and a packing surrounding the shaft above the upper bearing assembly for preventing the lubricant from said assembly from passing upwardly along said shaft.

9. A drive unit for submergible pumps adapted to connect said pump with a power unit including, an elongate housing having a rotatable drive shaft extending axially therethrough, a lower bearing assembly near the lower end of the shaft for rotatably supporting said lower end, means for supplying a lubricant to said lower bearing assembly, an upper bearing assembly spaced from the lower bearing assembly and having the drive shaft rotatable therein, means for supplying a lubricant to said upper bearing assembly, and packing means surrounding the shaft between the bearing assemblies for packing off around said shaft to prevent the flow of lubricant from one assembly to the other, the packing means including a pair of bearing elements which are rotatably connected to each other and also to the shaft, and a removable packing member confined between the elements and engaging the shaft.

ARTHUR F. SPENGLER.